US011656359B2

(12) United States Patent
Tang

(10) Patent No.: US 11,656,359 B2
(45) Date of Patent: May 23, 2023

(54) COMPUTERIZED IONOSPHERIC TOMOGRAPHY METHOD BASED ON VERTICAL BOUNDARY TRUNCATION RAYS

(71) Applicant: East China Jiaotong University, Nanchang (CN)

(72) Inventor: Jun Tang, Nanchang (CN)

(73) Assignee: East China Jiaotong University, Nanchang (CN)

( * ) Notice: Subject to any disclaimer, the term of this patent is extended or adjusted under 35 U.S.C. 154(b) by 414 days.

(21) Appl. No.: 17/110,454

(22) Filed: Dec. 3, 2020

(65) Prior Publication Data

US 2021/0389472 A1 Dec. 16, 2021

(30) Foreign Application Priority Data

Jun. 15, 2020 (CN) .......................... 202010544215.5

(51) Int. Cl.
*G01S 19/07* (2010.01)
*G06T 17/00* (2006.01)
*G06T 11/00* (2006.01)

(52) U.S. Cl.
CPC .......... *G01S 19/072* (2019.08); *G06T 11/006* (2013.01); *G06T 17/00* (2013.01); *G06T 2211/432* (2013.01)

(58) Field of Classification Search
None
See application file for complete search history.

(56) References Cited

PUBLICATIONS

Wen, Debao, Application of ionospheric tomography inversion to GPU data to study ionospheric electron-density distribution over China, Feb. 2011, Geodesy and Geodynamics, vol. 2, p. 66-67, https://www.sciencedirect.com/science/article/pii/S1674984715301580 (Year: 2011).*

Wen, Debao, Imaging the Three-Dimensional Ionospheric Structure with a Blob Basis Functional Ionospheric Tomography Model, Mar. 2020, Sensors, vol. 20, p. 1, 3, 6, https://www.mdpi.eom/1424-8220/20/8/2182 (Year: 2020).*

(Continued)

*Primary Examiner* — Joni Hsu
(74) *Attorney, Agent, or Firm* — Troutman Pepper Hamilton Sanders LLP; Christopher C. Close, Jr.

(57) ABSTRACT

The disclosed technology includes a computerized ionospheric tomography method based on vertical boundary truncation rays, which relates to the technical field of computerized ionospheric tomography (CIT). The method includes: obtaining an initial ionospheric electron density (IED) of each voxel in a target region and an ionospheric total electron content (TEC) value along a propagation path from a global navigation satellite system (GNSS) satellite; extending the target region so that GNSS stations within a certain range beyond the target region are encompassed within the target region; for GNSS stations within a certain range in the target region, calculating a vertical boundary truncation TEC value; for the GNSS stations within the target region, calculating a vertical boundary truncation TEC value; and building a three-dimensional CIT model based on the vertical boundary truncation TEC values $P_r$TEC and $P_s$TEC.

7 Claims, 7 Drawing Sheets

(56) References Cited

PUBLICATIONS

Jeffrey R. Austen, Steven J. Franke, C.H. Liu, Ionospheric imaging using computerized tomography, Radio Science, vol. 23, No. 3, pp. 299-307, May-Jun. 1988, Department of Electrical and Computer Engineering, University of Illinois at Urbana-Champaign.

* cited by examiner

COMPUTERIZED IONOSPHERIC TOMOGRAPHY METHOD BASED ON VERTICAL BOUNDARY TRUNCATION RAYS

CROSS REFERENCE TO RELATED APPLICATIONS

This application claims priority, and benefit under 35 U.S.C. § 119(e) of Chinese Patent Application No. 202010544215.5 filed 15 Jun. 2020. The disclosure of the prior application is hereby incorporated by reference as if fully set forth below.

TECHNICAL FIELD

The present disclosure relates to the technical field of computerized ionospheric tomography, and more particularly to a computerized ionospheric tomography method based on vertical boundary truncation rays.

BACKGROUND

Computerized ionospheric tomography (CIT), a new technique for space radio sounding, is the specific application of computerized tomography (CT) technology in ionospheric sounding. Austen et al. (1986) first proposed a CIT technique based on a global navigation satellite system (GNSS), which provides a new theory and technique for the determination of ionospheric electron density (IED) structures and can realize the three-dimensional reconstruction of the IED. This technique overcomes the defects of an ionospheric model based on thin layer assumption, traditional sounding means and occultation technique. In addition, it has received close attention from ionosphere researchers at home and abroad for its numerous advantages such as long sounding time, wide coverage, low cost, and capability to depict fine ionospheric structures. CIT methods, however, have limited applications with undesirable effect due to restrictions by insufficient quantity, unreasonable geometric distribution and low vertical resolution of multi-factor observation information.

SUMMARY

To solve the above problems, the present disclosure provides a computerized ionospheric tomography method based on vertical boundary truncation rays.

The present disclosure provides the following specific technical solution: a computerized ionospheric tomography method based on vertical boundary truncation rays includes:

S1: obtaining an initial ionospheric electron density (IED) of each voxel in a target region and an ionospheric total electron content (TEC) value along a propagation path from a global navigation satellite system (GNSS) satellite;

S2: extending the target region in step S1 so that GNSS stations within a certain range beyond the target region are encompassed within the target region;

S3: for GNSS stations within a certain range in the target region, calculating a vertical boundary truncation TEC value, denoted by $P_r TEC$;

S4: for the GNSS stations within the target region, calculating a vertical boundary truncation TEC value, denoted by $P_s TEC$;

S5: building a three-dimensional CIT model based on the vertical boundary truncation TEC values $P_r TEC$ and $P_s TEC$; and S6: resolving the CIT model in step S5 for inversion of the IED of the target region.

Further, S1 may include determining a longitude, a latitude, an altitude and time of the target region.

Further, S3 may specifically include:

S31: obtaining an initial IED value $N_e^0(r,t)$ by NeQuick model and a TEC value $TEC_0$ with the NeQuick model as prior information;

S32: for GNSS stations within a certain range beyond the target region, calculating a truncation factor $\lambda_r$ with the initial IED value $N_e^0(r,t)$ and $TEC_0$; and S33: calculating the value of $P_r TEC$ with the truncation factor $\lambda_r$ and the ionospheric TEC value $TEC_G$ along the propagation path from the GNSS satellite.

Further, S3 may specifically include:

S311: obtaining an initial IED value $N_e^0(r,t)$ by the NeQuick model and a TEC value $TEC_0$ with the NeQuick model as prior information;

S321: for GNSS stations within a certain range beyond the target region, calculating a truncation factor $\lambda_r$ with the initial IED value $N_e^0(r,t)$ and $TEC_0$ according to formulas (1) and (2):

$$P_r TEC_0 = \int_l N_e^0(r,t) ds \quad (1)$$

$$\lambda_r = \frac{P_r TEC_0}{TEC_0}, \quad (2)$$

where $TEC_0$ is the TEC value obtained with the NeQuick model as prior information; and S331: calculating the value of $P_r TEC$ with the truncation factor $\lambda_r$ and the ionospheric TEC value $TEC_G$ along the propagation path from the GNSS satellite according to formula (3):

$$P_r TEC = \lambda_r \cdot TEC_G \quad (3)$$

where $TEC_G$ is the ionospheric TEC value extracted from GNSS observation data.

Further, S4 may specifically include:

S41: obtaining an initial IED value $N_e^0(r,t)$ by the NeQuick model and a TEC value $TEC_0$ with the NeQuick model as prior information;

S42: for the GNSS stations within the target region, calculating a truncation factor $\lambda_s$ with the initial IED value $N_e^0(r,t)$ and $TEC_0$; and S43: calculating the value of $P_s TEC$ with the truncation factor $\lambda_s$ and the ionospheric TEC value $TEC_G$ along the propagation path from the GNSS satellite.

Further, S4 may specifically include:

S411: obtaining an initial IED value $N_e^0(r,t)$ by the NeQuick model and a TEC value $TEC_0$ with the NeQuick model as prior information;

S421: for GNSS stations within the extended section of the target region, calculating a truncation factor $\lambda_s$ with the initial IED value $N_e^0(r,t)$ and $TEC_0$ according to formulas (4) and (5):

$$P_s TEC_0 = \int_l N_e^0(r,t) ds \quad (4)$$

$$\lambda_s = \frac{P_s TEC_0}{TEC_0}, \quad (5)$$

where $TEC_0$ is the TEC value obtained with the NeQuick model as prior information; and S431: calculating the value of $P_sTEC$ with the truncation factor $\lambda_s$ and the ionospheric TEC value $TEC_G$ along the propagation path from the GNSS satellite according to formula (6):

$$P_sTEC = \lambda_2 \cdot TEC_G \quad (6)$$

where $TEC_G$ is the ionospheric TEC value extracted from GNSS observation data.

Further, the inversion of the IED of the target region in step S6 may be carried out according to formula (7):

$$y_{m \times 1} = A_{m \times n} x_{n \times 1} + e_{m \times 1} \quad (7)$$

where y is an m-dimensional column vector constituted by observed ionospheric TEC values, while A is an m n-dimensional row vector constituted by intercepts of rays in respective grids, x is an n-dimensional column vector constituted by unknown parameters, and e is an m-dimensional column vector constituted by observation noise and a discretization error.

The present disclosure has the following advantages:

The method in the present disclosure permits building of a three-dimensional ionosphere model based on truncation rays traversing vertical boundaries (also known as a truncation ray mode, TRM) with improved CIT inversion accuracy, and may be of great application value in the improvement of positioning accuracy of GNSS navigation and the spatial environmental ability of disaster prevention and alleviation.

The present disclosure may have other objectives, features and advantages than the objective, features and advantages as described above. The present disclosure will be further described below in detail.

DETAILED DESCRIPTION

To make the objective, technical solution and advantages of the present disclosure clearer and more comprehensible, the present disclosure will be further described below in detail by way of example. It will be understood that the specific embodiment described herein is merely used to explain, rather than limit, the present disclosure.

In the embodiment of the present disclosure, the ionospheric TEC value refers to ionospheric total electron content, and GNSS denotes global navigation satellite system.

Figure 1:
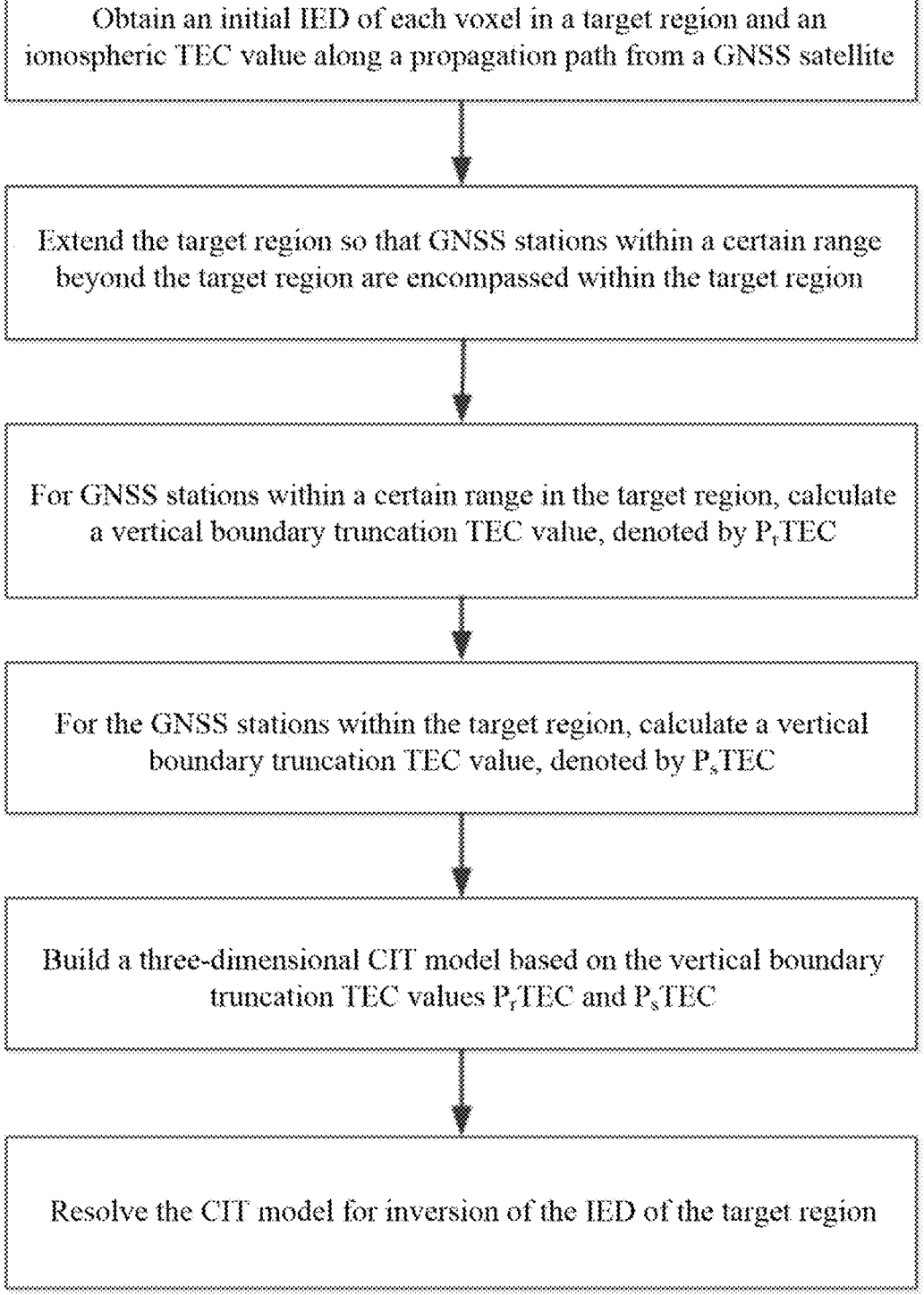
FIG. 1 is a flowchart of a computerized ionospheric tomography method based on vertical boundary truncation rays according to an embodiment of the present disclosure.

Referring to FIG. 1, a computerized ionospheric tomography method based on vertical boundary truncation rays includes:

S1: obtain an initial IED of each voxel in a target region and an ionospheric TEC value along a propagation path from a GNSS satellite.

Figure 4:
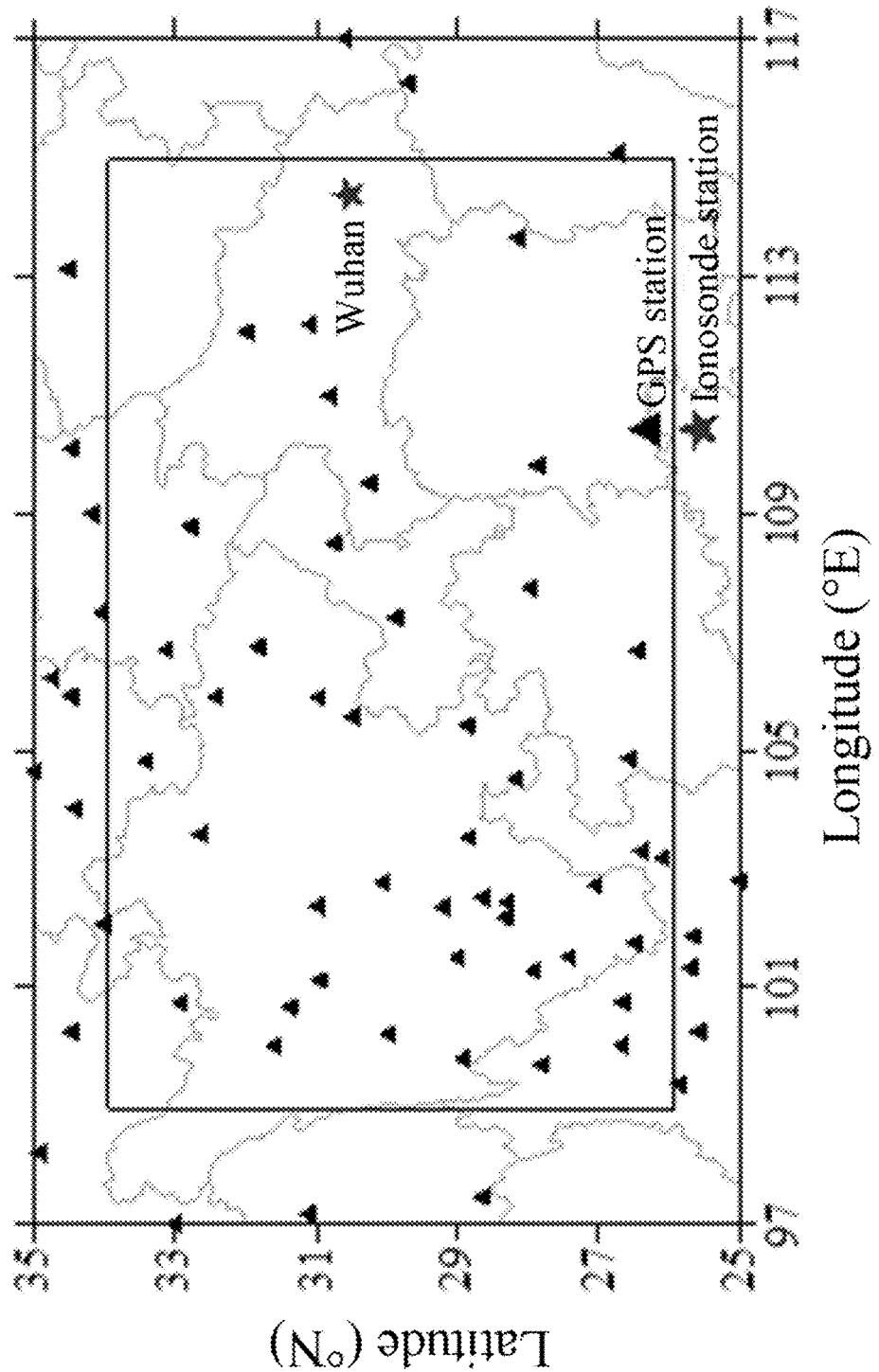
FIG. 4 is a distribution map of GNSS stations in an experimental region according to an embodiment of the present disclosure.

The target region may be selected based on data of a longitude ranging from 99° E to 115° E, a latitude ranging from 26° N to 34° N, and an altitude ranging from 100 km to 1000 km for inversion. Grid intervals in the directions of longitude and latitude are set to 1°, while an interval in the direction of altitude is set to 50 km, as shown in FIG. 4.

The initial IED of each voxel in the target region is obtained by an ionospheric empirical model NeQuick.

S2: extend the target region in step S1 so that GNSS stations within a certain range beyond the target region are encompassed within the target region.

Figure 2:
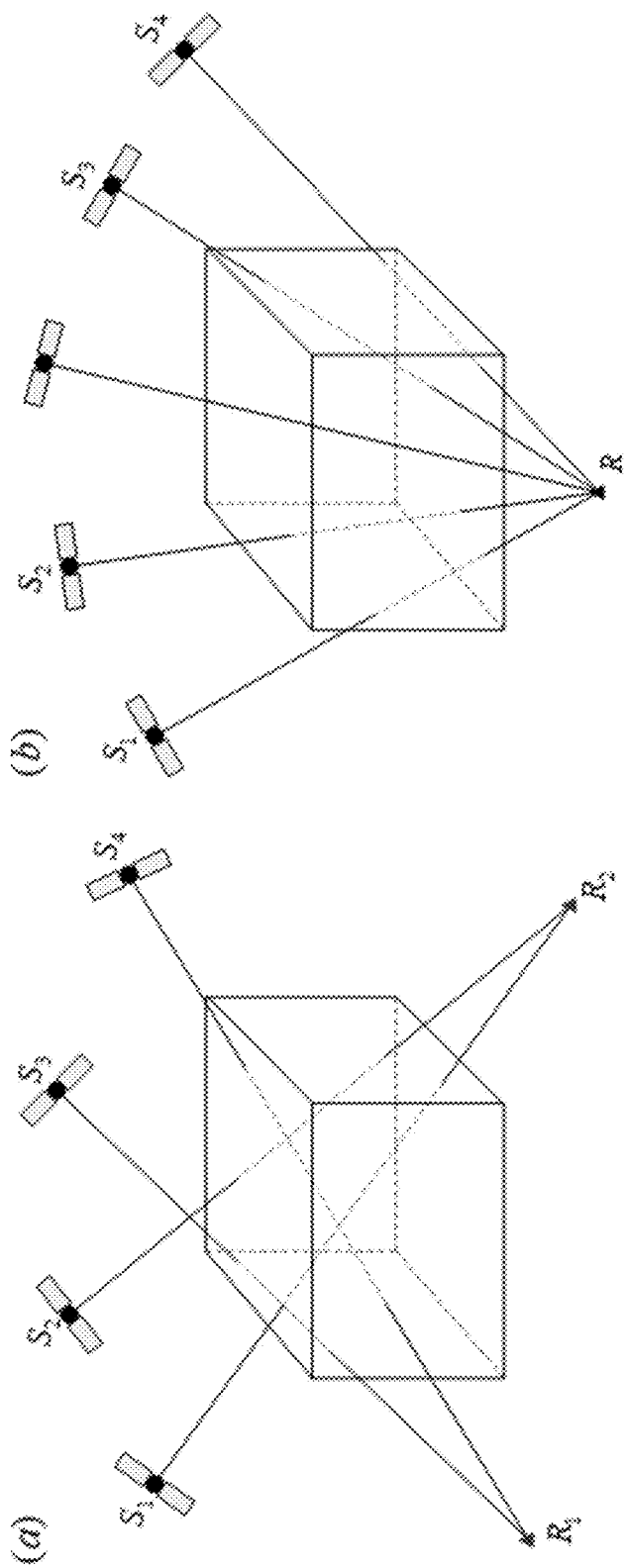
FIG. 2 is a schematic distribution diagram of GNSS rays based on vertical boundaries according to an embodiment of the present disclosure.
Figure 3:
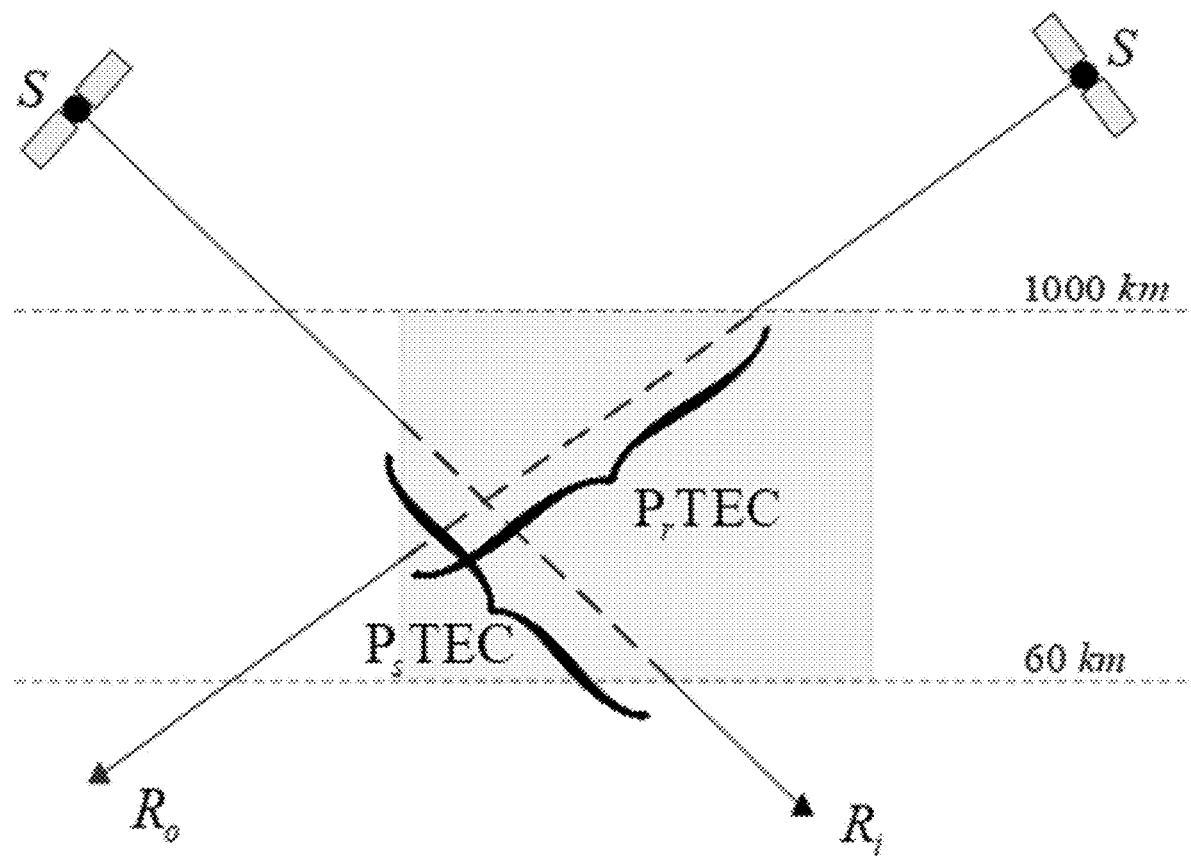
FIG. 3 is a schematic diagram of calculations of vertical boundary truncation TECs of a target region according to an embodiment of the present disclosure.

S3: for GNSS stations within a certain range in the target region, calculate a vertical boundary truncation TEC value, denoted by $P_rTEC$. The range denoted by $P_rTEC$ is as shown in FIG. 2 and FIG. 3.

Specific building process of $P_rTEC$ model may include:

S311: obtain an initial IED value $N_e^0(r,t)$ by the NeQuick model and a TEC value $TEC_0$ with the NeQuick model as prior information.

S321: for GNSS stations within a certain range beyond the target region, calculate a truncation factor $\lambda_r$ with the initial IED value $N_e^0(r,t)$ and $TEC_0$ according to formulas (1) and (2):

$$P_rTEC_0 = \int_l N_e^0(r,t)ds \quad (1)$$

$$\lambda_r = \frac{P_rTEC_0}{TEC_0}, \quad (2)$$

where $TEC_0$ is the TEC value obtained with the NeQuick model as prior information; and S331: calculate the value of $P_rTEC$ with the truncation factor $\lambda_r$ and the ionospheric TEC value $TEC_G$ along the propagation path from the GNSS satellite according to formula (3):

$$P_rTEC = \lambda_r \cdot TEC_G \quad (3)$$

where $TEC_G$ is the ionospheric TEC value extracted from GNSS observation data.

S4: for the GNSS stations within the target region, calculate a vertical boundary truncation TEC value, denoted by $P_sTEC$. The range denoted by $P_sTEC$ is as shown in FIG. 2 and FIG. 3.

Specific building process of $P_sTEC$ model may include:

S411: obtain an initial IED value $N_e^0(r,t)$ by the NeQuick model and a TEC value $TEC_0$ with the NeQuick model as prior information;

S421: for the GNSS stations within the target region, calculate a truncation factor $\lambda_s$ with the initial IED value $N_e^0(r,t)$ and $TEC_0$; and S431: calculate the value of $P_sTEC$ with the truncation factor $\lambda_s$ and the ionospheric TEC value $TEC_G$ along the propagation path from the GNSS satellite.

S5: build a three-dimensional CIT model based on the vertical boundary truncation TEC values $P_rTEC$ and $P_sTEC$.

S6: resolve the CIT model in step S5 for inversion of the IED of the target region.

The inversion of the IED of the target region in step S6 may be carried out according to formula (7):

$$y_{m\times 1} = A_{m\times n} x_{n\times 1} + e_{m\times 1} \quad (7)$$

where y is an m-dimensional column vector constituted by observed ionospheric TEC values, while A is an m n-dimensional row vector constituted by intercepts of rays in respective grids, x is an n-dimensional column vector constituted by unknown parameters, and e is an m-dimensional column vector constituted by observation noise and a discretization error.

Figure 5:
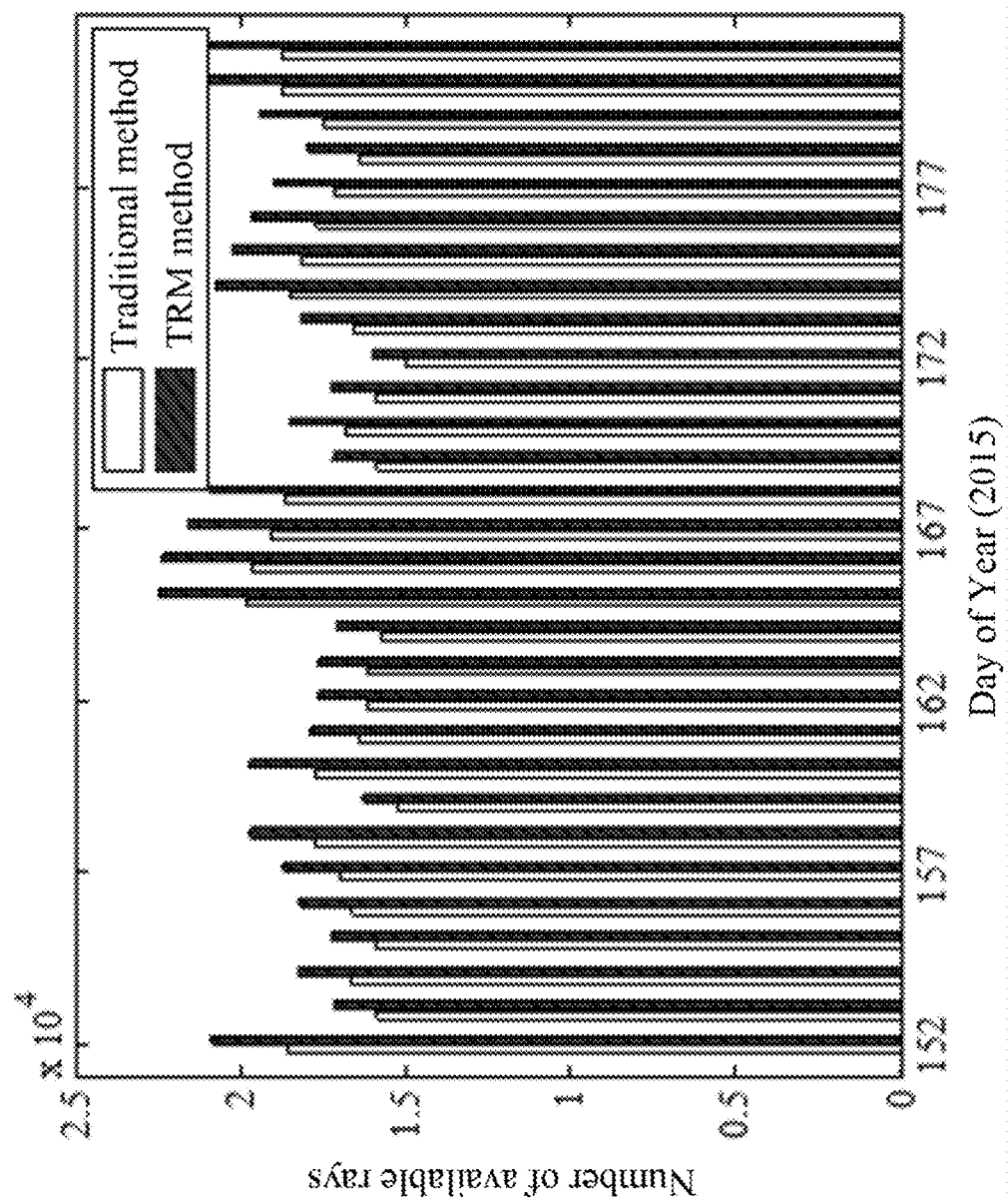
FIG. 5 shows comparison of average numbers of available rays per day between the TRM method and a traditional method according to an embodiment of the present disclosure.

FIG. 5 shows comparison of average numbers of available rays per day between the method in the present disclosure and a traditional method, where the 152th day to the 181th day of 2015, 30 days in total, were selected for experimental analysis. As can be seen from the figure, the average number of available rays per day based on the TRM method is obviously greater than that based on the traditional method. This indicates that the TRM based on vertical boundaries in the present disclosure may greatly increase the number of available rays, so that information for modeling is increased, thus being conducive to improving the CIT inversion accuracy.

Figure 6:
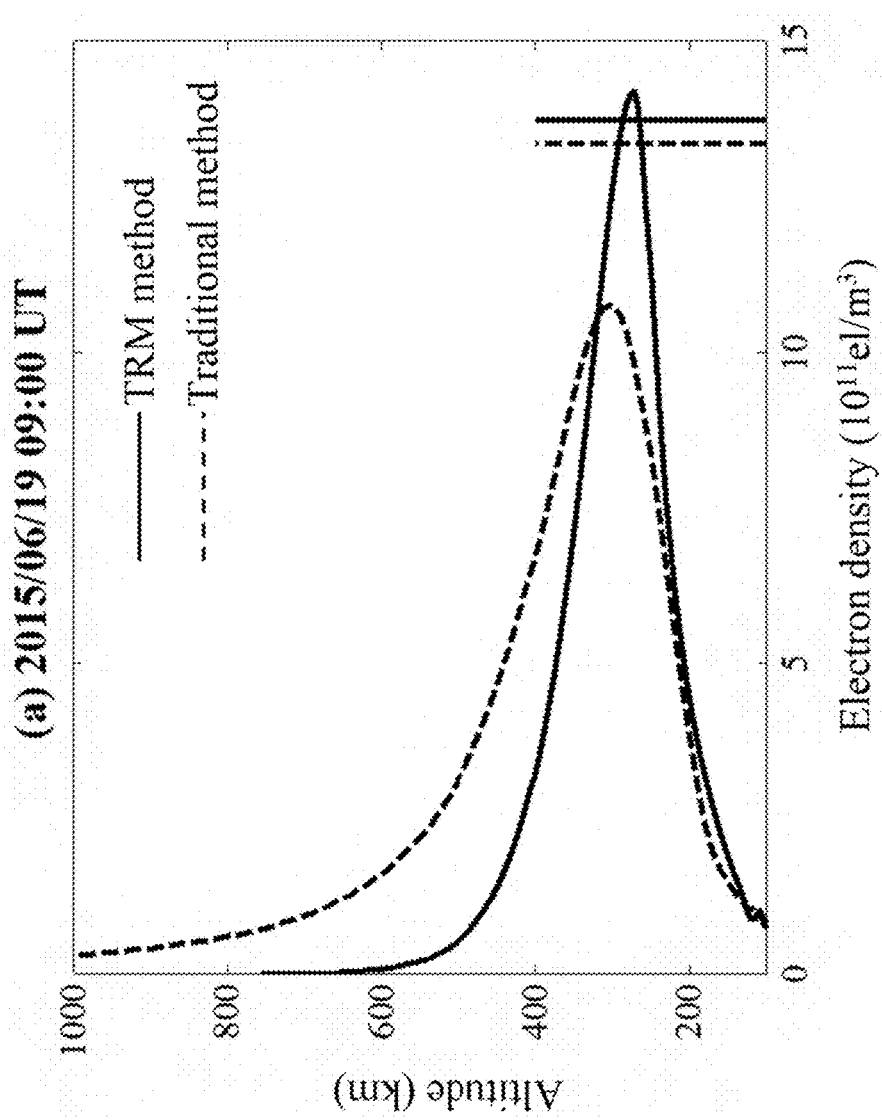
FIG. 6 shows comparison of IED profiles between the TRM method and a traditional method, and an ionosonde station at 9:00 UT according to an embodiment of the present disclosure.
Figure 7:
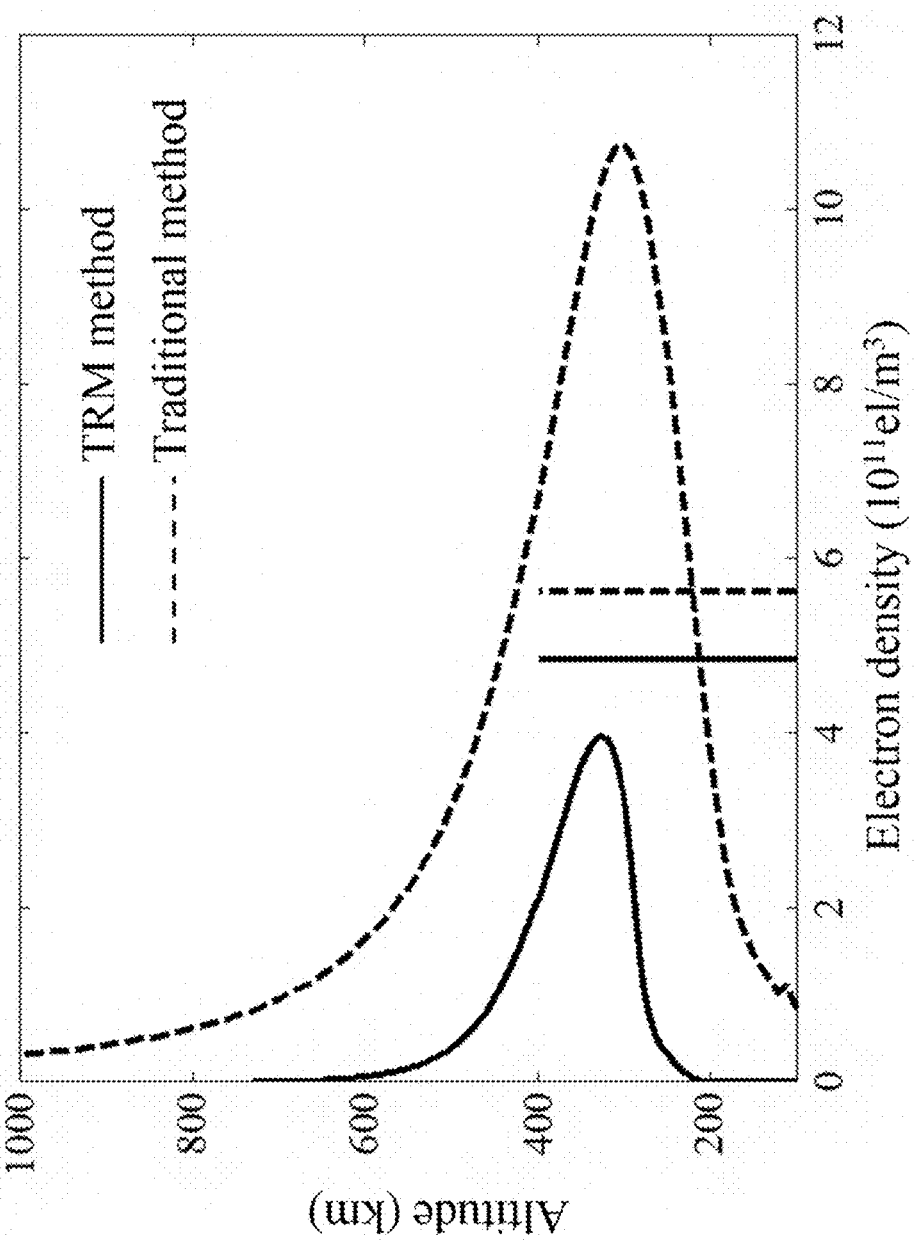
FIG. 7 shows comparison of IED profiles between the TRM method and a traditional method, and an ionosonde station at 19:00 UT according to an embodiment of the present disclosure.

FIG. 6 and FIG. 7 show comparisons of IED profiles measured by an ionosonde at different moments with inversion results based on the TRM method and a traditional method.

Besides, FIG. 6 and FIG. 7 show the results of comparisons of electron density profiles at 9:00 UT and 19:00 UT on Jun. 19, 2015, respectively. From the results, the F2 peak IED of the inversion results based on the TRM method is closer to the data of the ionosonde. Experimental results indicate that the TRM based on vertical boundaries may effectively improve the CIT inversion accuracy.

The foregoing are merely descriptions of the preferred embodiment of the present disclosure, which are not intended to limit the present disclosure. Any modifications, equivalent replacements and improvements made within the spirit and principle of the present disclosure shall fall within the protection scope of the present disclosure.

What is claimed is:

1. A computerized ionospheric tomography method based on vertical boundary truncation rays, comprising:
obtaining an initial ionospheric electron density (IED) of each voxel in a target region and an ionospheric total electron content (TEC) value along a propagation path from global navigation satellite system (GNSS) stations;
extending the target region so that GNSS stations within a certain range beyond the target region are encompassed within the target region;
calculating a vertical boundary truncation TEC value, denoted by $P_rTEC$ for GNSS stations within a predetermined range in the target region;
calculating a vertical boundary truncation TEC value, denoted by $P_sTEC$ for GNSS stations within the target region;
building a three-dimensional CIT model based on the vertical boundary truncation TEC values detonated by $P_rTEC$ and $P_sTEC$; and
resolving the CIT model for inversion of the IED of the target region.

2. The computerized ionospheric tomography method based on vertical boundary truncation rays according to claim 1, wherein
obtaining the initial IED of each voxel in the target region and the ionospheric TEC value along the propagation path from GNSS stations comprises determining a longitude, a latitude, an altitude and time of the target region.

3. The computerized ionospheric tomography method based on vertical boundary truncation rays according to claim 1, wherein
calculating the vertical boundary truncation TEC value denoted by $P_rTEC$ for GNSS stations within the predetermined range in the target region comprises:
obtaining an initial IED value detonated by $N_e^0(r,t)$ by a NeQuick model and a TEC value detonated by $TEC_0$ with the NeQuick model as prior information;
calculating a truncation factor $\lambda_r$ with the initial IED value detonated by $N_e^0(r,t)$ and the TEC value detonated by $TEC_0$ for GNSS stations within a predetermined range beyond the target region; and
calculating the vertical boundary truncation TEC value detonated by $P_rTEC$ with the truncation factor $\lambda_r$ and an ionospheric TEC value detonated by $TEC_G$ along the propagation path from GNSS stations.

4. The computerized ionospheric tomography method based on vertical boundary truncation rays according to claim 1, wherein calculating the vertical boundary truncation TEC value denoted by $P_rTEC$ for GNSS stations within the predetermined range in the target region comprises:
obtaining an initial IED value detonated by $N_e^0(r,t)$ by a NeQuick model and a TEC value detonated by $TEC_0$ with the NeQuick model as prior information;
calculating a truncation factor $\lambda_r$ with the initial IED value detonated by $N_e^0(r,t)$ and the TEC value detonated by $TEC_0$ for GNSS stations within a predetermined range beyond the target range according to a first formula:

$$P_rTEC_0 = \int_l N_e^0(r,t)ds;$$

and a second formula:

$$\lambda_r = \frac{P_rTEC_0}{TEC_0}, \quad [[(2)]]$$

wherein $TEC_0$ is the TEC value obtained with the NeQuick model as prior information; and
calculating the vertical boundary truncation TEC value detonated by $P_rTEC$ with the truncation factor $\lambda_r$ and an ionospheric TEC value detonated by $TEC_G$ along the propagation path from GNSS stations according to a third formula:

$$P_rTEC = \lambda_r \cdot TEC_G$$

wherein $TEC_G$ is the ionospheric TEC value extracted from GNSS observation data.

5. The computerized ionospheric tomography method based on vertical boundary truncation rays according to claim 1, wherein calculating the vertical boundary truncation TEC value denoted by $P_sTEC$ for the GNSS stations within the target region comprises:
obtaining an initial IED value detonated by $N_e^0(r,t)$ by a NeQuick model and a TEC value detonated by $TEC_0$ with the NeQuick model as prior information;

calculating a truncation factor $\lambda_s$ with the initial IED value detonated by $N_e^0(r,t)$ and the TEC value detonated by $TEC_0$ for the GNSS stations within the target region; and calculating the vertical boundary truncation TEC value detonated by $P_s TEC$ with the truncation factor $\lambda_s$ and an ionospheric TEC value $TEC_G$ along the propagation path from GNSS stations.

6. The computerized ionospheric tomography method based on vertical boundary truncation rays according to claim 1, wherein calculating the vertical boundary truncation TEC value denoted by $P_s TEC$ for the GNSS stations within the target region comprises:

obtaining an initial IED value detonated by $N_e^0(r,t)$ by a NeQuick model and a TEC value detonated by $TEC_0$ with the NeQuick model as prior information;

calculating a truncation factor $\lambda_s$ with the initial IED value detonated by $N_e^0(r,t)$ and the TEC value detonated by $TEC_0$ for GNSS stations within an extended section of the target region according to a first formula:

$$P_s TEC_0 = \int_l N_e^0(r,t) ds;$$

and a second formula:

$$\lambda_s = \frac{P_s TEC_0}{TEC_0} \qquad [[(5)]]$$

wherein $TEC_0$ is the TEC value obtained with the NeQuick model as prior information; and calculating the vertical boundary truncation TEC value detonated by $P_s TEC$ with the truncation factor $\lambda_s$ and an ionospheric TEC value $TEC_G$ along the propagation path from GNSS stations according to third formula:

$$P_s TEC = \lambda_s \cdot TEC_G$$

wherein $TEC_G$ is the ionospheric TEC value extracted from GNSS observation data.

7. The computerized ionospheric tomography method based on vertical boundary truncation rays according to claim 1, wherein the inversion of the IED of the target region in the resolving the CIT model for inversion of the IED of the target region is carried out according to a first formula:

$$y_{m \times 1} = A_{m \times n} \cdot x_{n \times 1} + e_{m \times 1}$$

wherein Y is an m-dimensional column vector constituted by observed ionospheric TEC values, $A_{m \times n}$ is dimensional row vectors constituted by intercepts of rays in respective grids, x is an n-dimensional column vector constituted by unknown parameters, and e is an m-dimensional column vector constituted by observation noise and a discretization error.

* * * * *